March 1, 1932.  A. O. AUSTIN  1,847,462
TRANSMISSION LINE SUPPORT
Filed March 11, 1929  3 Sheets-Sheet 1
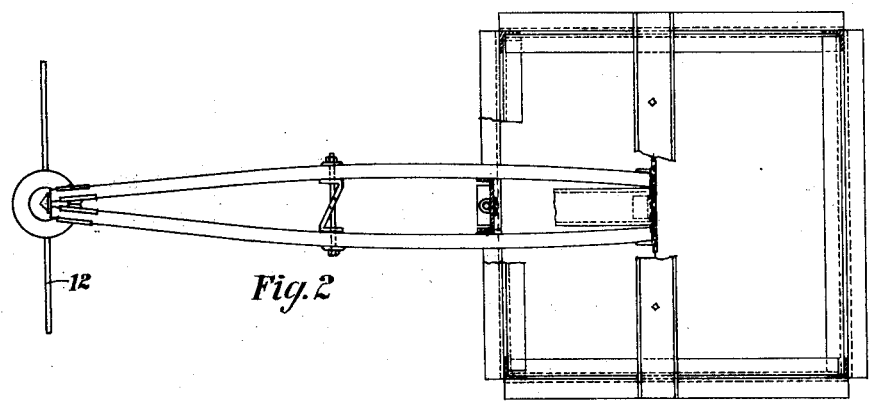
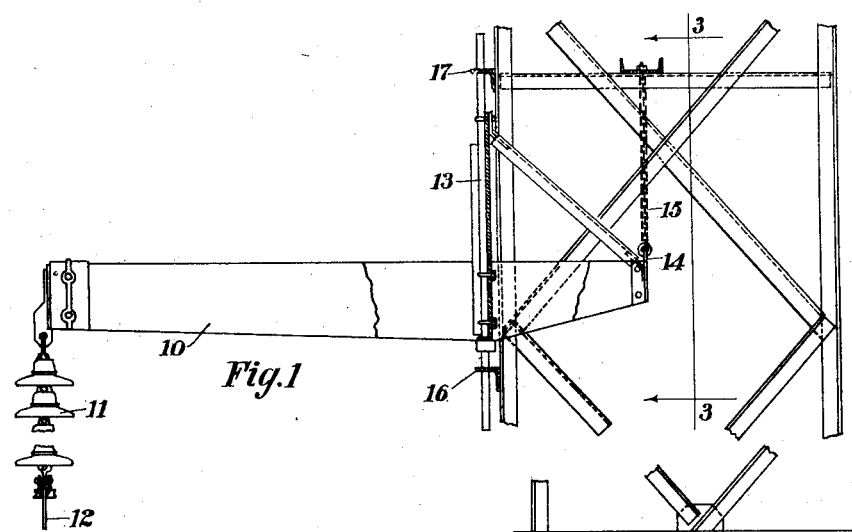
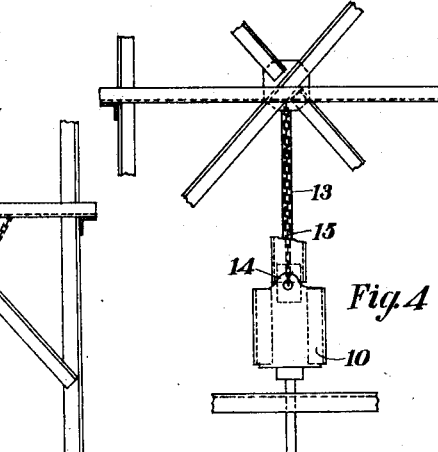
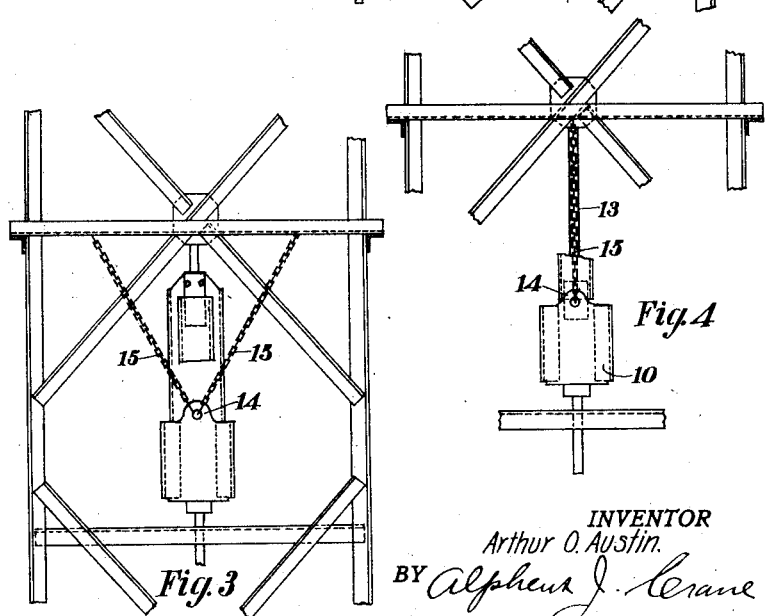
INVENTOR
Arthur O. Austin.
BY
ATTORNEY March 1, 1932. A. O. AUSTIN 1,847,462
TRANSMISSION LINE SUPPORT
Filed March 11, 1929    3 Sheets-Sheet 2
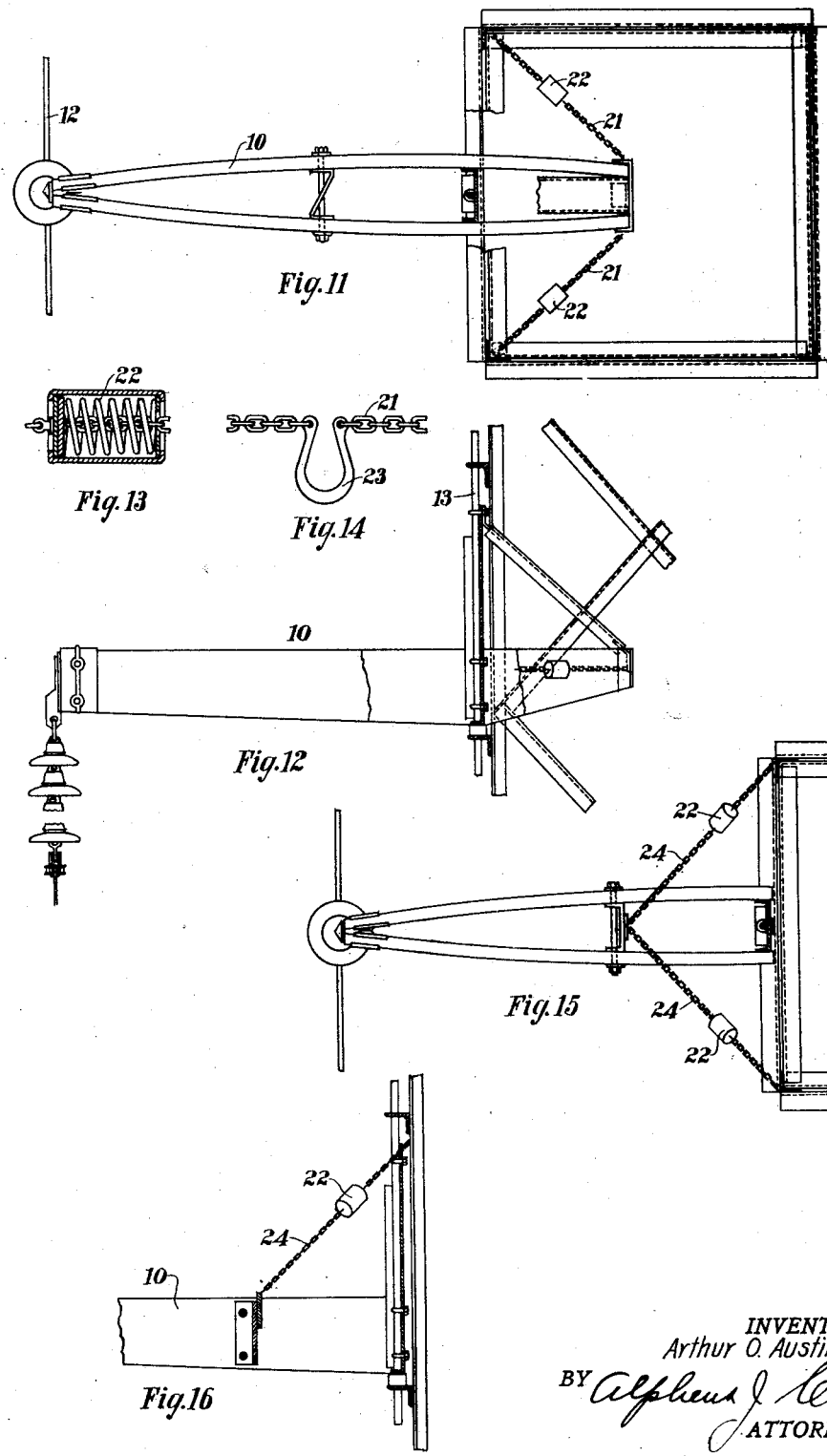
INVENTOR
Arthur O. Austin
BY
ATTORNEY March 1, 1932. A. O. AUSTIN 1,847,462
TRANSMISSION LINE SUPPORT
Filed March 11, 1929    3 Sheets-Sheet 3
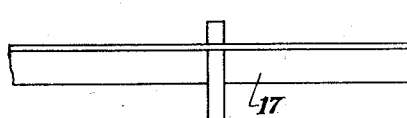
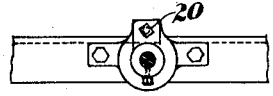
Fig.7
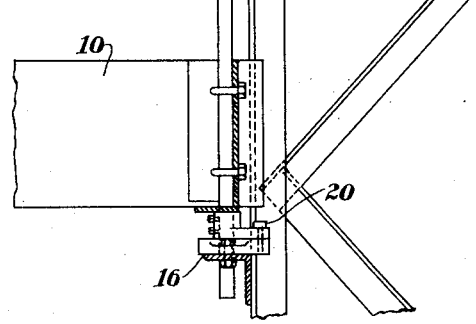
Fig.6
Fig.5
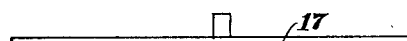
Fig.8
Fig.10
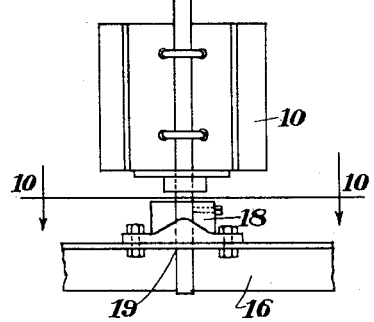
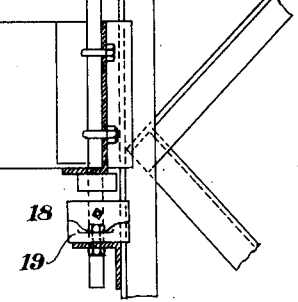
Fig.9
INVENTOR
Arthur O. Austin.
BY
ATTORNEY Patented Mar. 1, 1932

1,847,462

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

TRANSMISSION LINE SUPPORT

Application filed March 11, 1929. Serial No. 346,139.

This invention relates to supports for transmission lines having horizontally projecting supporting arms, and has for one of its objects the provision of a line support which will relieve unbalanced loads on the supported line and prevent injury to the supporting structure.

A further object is to provide a line support having a cross arm arranged to yield to unbalanced loads of a predetermined amount but to afford a stable support for the cross arm so long as the force on the cross arm does not exceed a predetermined amount.

A further object of the invention is to provide a transmission line support which shall be of improved construction and operation.

Other objects and advantages will appear from the following description.

The invention is exemplified in the combination and arrangement of parts shown in the accompanying drawings and described in the following specification, and it is more particularly pointed out in the appended claims.

In the drawings:

Fig. 1 is a fragmentary elevation of a portion of a tower having one form of the present invention applied thereto.

Fig. 2 is a fragmentary top plan of the cross arm shown in Fig. 1.

Fig. 3 is a vertical section substantially on line 3—3 of Fig. 1.

Fig. 4 is a view similar to Fig. 3 but showing a slightly modified construction.

Fig. 5 is a fragmentary rear elevation and Fig. 6 is a fragmentary vertical section showing another form of the invention.

Fig. 7 is a horizontal section on line 7—7 of Fig. 5.

Figs. 8 and 9 are views similar to Figs. 5 and 6 respectively showing another form of the invention.

Fig. 10 is a section on line 10—10 of Fig. 8.

Fig. 11 is a fragmentary top plan of another modification.

Fig. 12 is part side elevation and part vertical section of the construction of Fig. 11.

Figs. 13 and 14 are elevations of details.

Fig. 15 is a fragmentary top plan and Fig. 16 is a fragmentary side elevation of another modification.

In high voltage transmission lines, it is necesssary to provide considerable insulation in order to prevent flash-overs due to the normal operating voltage or to voltages induced by operating surges or by lightning. This necessitates considerable clearance between the conductors and conducting or grounded tower members. It is customary to support the insulators to which the conductors are attached from a cross arm projecting from the tower or body of the structure. As the point of support for the line or end of the cross arm may be some distance from the axis of the tower, an unbalanced load on the conductor will produce a torsional moment in the tower and a bending moment in the cross arm. Where the arm is free to swing, this bending moment can be relieved. It is necessary, however, where the arm swings that some stabilizing factor be provided.

In one form of tower construction, the cross arm has been supported through a hinge which makes an angle with the axis of the tower. While this arrangement tends to relieve the tower, any slight longitudinal force on the conductor produces a movement in the arm which for many reasons is objectionable. Where the heavy bending stresses produced by unbalanced loads on the conductor can be reduced or eliminated, it is possible to make use of the insulating value of wood cross arms which will greatly increase the effective insulation for high voltage transients produced by lightning or operation. In the present invention an arm which is free to rotate only after certain stresses are exceeded is provided. The construction can be applied not only to new towers, but is applicable to many existing structures. The cross arm may be hinged within the tower or the hinge may be placed in the center or other suitable portion of the tower face or even outside of the tower outline if desired.

In the form of the invention illustrated in Figs. 1, 2 and 3, a cross arm composed of a member 10 supporting an insulator 11 and conductor 12 is provided with a rigidly attached spindle 13. The rear end of the cross arm is equipped with a suitable eye 14 to which links or chains 15 are attached. The rigidly attached shaft 13 is free to move in a vertical direction through holes in the members 16 and 17. Where an unbalanced load in transverse direction to the arm is produced by an uneven load in the conductor, the arm is deflected in the direction of the unbalanced load. Since the bearing shaft 13 is free to slide in a vertical direction in the members 16 and 17, the vertical load or component is carried by the chains 15. When the arm 10 is deflected, one of the chains will either have to be lengthened or the arm will have to be raised. In the construction illustrated, the arm will be raised. By controlling the length and location of the chains 15, it is possible to place a very material stabilizing component upon the cross arm or by use of a single chain as shown in Fig. 4 it is possible to allow the cross arm to deflect very freely under an unbalanced load in a longitudinal direction. Where two links arranged at an angle are used, the point at which movement due to an unbalanced load starts can be controlled. The links 15 may be attached in any suitable place within the body of the tower or may be attached to the face of the tower, providing they are located so that they will produce the necessary stabilizing force.

In many installations, it is not necessary to equip the arm with means which will restore its position automatically with a reduction or removal of the unbalanced load. The construction described, with slight modification, lends itself readily to this arrangement. In such cases as shown in Figs. 5 to 10 inclusive, the shaft member 13 with the supports 16 and 17 forms a hinge. In Figs. 8, 9 and 10 the shaft member 13 is fitted with a cam 18 working on a support 19 which causes the arm 10 to be lifted when the unbalanced load exceeds a definite value. In place of the notch and groove or cam construction, a shear pin 20 may be used as shown in Figs. 5, 6 and 7 or one which will bend, allowing the arm to deflect and relieve the stress.

In the form of the invention shown in Figs. 11 and 12, stabilizing links 21 are disposed in a substantially horizontal plane and are provided with extension springs 22. The springs 22 are arranged in compression as shown in Fig. 13 and are preferably placed under an initial stress so that a predetermined force must be exerted upon the springs before they will begin to yield. This gives a degree of stability to the arm 10 so that it will not swing upon its pivot 13 until subjected to a force exceeding a predetermined amount. It will be seen that in this construction, the arm 10 will not rise during its swinging movement but that the weight will be sustained by the pivot rod 13 in the same horizontal position for the various angles of the cross arm 10.

The yielding links shown in Fig. 13 will automatically restore the cross arm to its normal position upon release of torsional moment. In lieu of the form of yielding link shown in Fig. 13, the link 23 may be substituted or any other form of link which will be deformed when subjected to a force exceeding a predetermined amount. The U-shaped link in Fig. 14 may be arranged to bend and take a permanent set when excessive force is exerted thereon or it may be so constructed that it will break. It is apparent that this form of link will not automatically restore itself but will have to be replaced by a new link or rebend into shape, although of course it may be made of spring material so that it will automatically return when the excess force is removed. This is not a serious disadvantage however, for the reason that the cross arm is not designed to swing except under abnormal conditions which will usually require repair of the line, and if the form of link as shown in Fig. 14 is employed, a new link may be substituted by the same workmen who repair the line.

In the form of the invention shown in Figs. 15 and 16, chains 24 are provided instead of the horizontal chains 21. The chains 24 are inclined as shown clearly in the drawing so as to assist in supporting the weight on the arm 10 and to provide a point of support spaced outwardly beyond the face of the tower. The yielding links 22 are similar to those shown in Fig. 13 and preferably require a force of predetermined amount before they will begin to yield. The springs, however, may be sufficiently yielding to permit lateral swinging of the arm without raising the arm upwardly thus permitting the arm to swing in a horizontal plane. Of course, if so desired, the springs may be strong enough so that they will lift the arm after it swings beyond a predetermined position or they may be made to lift the arm from the beginning of any angular movement.

I claim:

1. A transmission line support comprising a horizontally extending arm mounted to swing about a substantially vertical axis, and means for lifting said arm as a whole when said arm is rotated upon its axis.

2. A transmission line support comprising a horizontally extending arm mounted to swing about a substantially vertical axis, a transmission line carried by said arm and extending transversely thereof, and means for lifting said arm as a whole when said arm is swung upon its axis, said lifting means being arranged to prevent rotation of said arm upon its axis when the moment of the force upon said arm about said axis is less than a predetermined amount.

3. A transmission line support comprising a horizontally extending arm mounted to swing about an upright axis, said arm being arranged to move freely in the direction of said axis, and a link for supporting said arm, said link being arranged to lift said arm when said arm is swung upon its axis.

4. A transmission line support comprising a horizontally extending arm mounted to swing about an upright axis and to move freely along said axis, and a suspension link for supporting said arm, the end of said link connected with said arm being arranged to move upwardly when said arm is swung about its axis.

5. A transmission line support comprising a horizontally extending arm mounted to swing about an upright axis and to move in the direction of said axis, and a pair of suspension links for supporting said arm, said links being spaced apart at their upper ends.

6. A transmission line support comprising a horizontally extending arm arranged to swing about an upright axis and to move freely in the direction of said axis, and a stabilizing link connected with said arm and arranged to shift said arm in the direction of its axis when said arm is rotated about said axis.

7. A transmission line support comprising a horizontally extending arm mounted to swing about an upright axis and to move in the direction of said axis, and a pair of stabilizing links connected to said arm and extending therefrom at oblique angles to each other to shift said arm in the direction of its axis when said arm is rotated in either direction about said axis.

8. A transmission line support comprising a metal tower, a wooden cross arm mounted on said tower and arranged to swing about an upright axis, one end of said arm being extended into said tower, and a metal suspension link connected with said end for supporting the weight of said arm, said link being arranged to lift said arm when said arm is swung about its axis.

9. A transmission line support comprising a tower, a cross arm extending horizontally away from said tower and having one end thereof projecting into said tower, said cross arm being mounted to swing about an upright axis and to move vertically along said axis, and a pair of suspension links secured to the end of said arm within said tower for supporting the weight of said arm, said links having their upper ends spaced apart and attached to said tower.

10. A transmission line support comprising a cross arm mounted to rotate about an upright axis, and a cam for lifting said crossarm when said arm is rotated about its axis.

11. The combination with a support, of a cross arm pivotally mounted on said support, a stay for holding said cross arm against rotation on said support, said stay being inclined to the horizontal and vertical planes of said cross arm to enable said stay to support said cross arm and also to resist rotation of said cross arm, a transmission line carried by said cross arm, said stay being secured to said cross arm at the side of said support adjacent said transmission line, and a spring member connected to said stay to permit extension of said stay when the force thereon exceeds a predetermined amount.

12. The combination with a transmission tower, of an arm for supporting the transmission lines, said arm comprising a beam pivotally connected at one end to the tower at a point appreciably below the upper end thereof, a pair of truss members fixedly connected at transversely spaced points of said tower at points materially above said beam and extending diagonally downward and connected to said beam, said truss members being adapted to normally hold said beam against swinging movement about its pivotal mounting under normal loads and being yieldable to permit swinging of said beam under abnormal loads.

In testimony whereof I have signed my name to this specification this 9th day of March, A. D. 1929.

ARTHUR O. AUSTIN.